(12) United States Patent
Booss et al.

(10) Patent No.: US 10,019,331 B2
(45) Date of Patent: Jul. 10, 2018

(54) MEMORY ALLOCATION AND RECOVERY STRATEGIES FOR BYTE-ADDRESSABLE NON-VOLATILE RAM (NVRAM)

(71) Applicant: SAP SE, Walldorf (DE)

(72) Inventors: Daniel Booss, Wiesloch (DE); Ivan Schreter, Malsch (DE); Ismail Oukid, Leimen (DE); Adrien Lespinasse, Grenoble (FR)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 14/973,447

(22) Filed: Dec. 17, 2015

(65) Prior Publication Data

US 2016/0371162 A1    Dec. 22, 2016

Related U.S. Application Data

(60) Provisional application No. 62/183,100, filed on Jun. 22, 2015.

(51) Int. Cl.
| | |
|---|---|
| *G06F 11/00* | (2006.01) |
| *G06F 11/20* | (2006.01) |
| *G06F 3/06* | (2006.01) |

(52) U.S. Cl.
CPC ........ *G06F 11/2094* (2013.01); *G06F 3/0619* (2013.01); *G06F 3/0631* (2013.01); *G06F 3/0679* (2013.01); *G06F 2201/805* (2013.01)

(58) Field of Classification Search
CPC ............. G06F 11/2094; G06F 11/0727; G06F 11/073; G06F 11/1402; G06F 11/1446; G06F 11/1448; G06F 11/1471; G06F 11/261; G06F 3/0619; G06F 3/0631; G06F 3/0679; G06F 2201/805

USPC .............................. 714/6.12, 6.1, 6.3, 29, 42
See application file for complete search history.

(56) References Cited

U.S. PATENT DOCUMENTS

| | | | |
|---|---|---|---|
| 6,944,742 B1 * | 9/2005 | Shoff .................... | G06F 3/0608 711/170 |
| 8,532,973 B1 * | 9/2013 | CaraDonna ............. | G06F 3/067 703/13 |
| 2006/0026211 A1 * | 2/2006 | Potteiger ................. | G06F 3/061 |

(Continued)

OTHER PUBLICATIONS

U.S. Appl. No. 62/009,808, filed Jun. 9, 2014, Booss et al.

(Continued)

*Primary Examiner* — Joseph D Manoskey
(74) *Attorney, Agent, or Firm* — Klarquist Sparkman, LLP

(57) ABSTRACT

Disclosed herein are innovations in memory management and data recovery for systems that operate using storage class memory (SCM), such as non-volatile RAM (NVRAM). The disclosed innovations have particular application to production database systems, where reducing database downtime in the event of a system crash is highly desirable. Embodiments of the disclosed technology can address a variety of problems that exist during a system crash. For example, embodiments of the disclosed technology can be used to address the loss of the physical memory mapping and/or the loss of the CPU cache that typically occurs in the event of a system crash. Furthermore, embodiments of the disclosed technology can be used to prevent data inconsistency and/or memory leak problems that may arise in the event of a system crash.

20 Claims, 6 Drawing Sheets

(56) References Cited

U.S. PATENT DOCUMENTS

| | | | | |
|---|---|---|---|---|
| 2013/0111105 | A1* | 5/2013 | Lain | G06F 12/0246 |
| | | | | 711/103 |
| 2015/0161004 | A1* | 6/2015 | Camp | G06F 11/1076 |
| | | | | 714/6.24 |
| 2015/0324125 | A1* | 11/2015 | Li | G06F 3/0631 |
| | | | | 711/103 |
| 2015/0355981 | A1 | 12/2015 | Booss et al. | |

OTHER PUBLICATIONS

Oukid et al., "SOFORT: A Hybrid SCM-DRAM Storage Engine for Fast Data Recovery," *DaMoN '14 Proceedings of the Tenth International Workshop on Data Management on New Hardware*, 7 pp. (2014).

\* cited by examiner

400

```
1  void inline SmallPAllocator::allocateSmall_step1(PPtrBase& pptr, size_t size)
2  {
3      int blockSizeIndex = correspondingBlockSizeIndex(size);
4
5      m_RcItem->m_ArgSize = size;
6      flush(&m_RcItem->m_ArgSize);
7
8      m_RcItem->m_pArgPPtr.init(&pptr);
9      flush(&m_RcItem->m_pArgPPtr);
10
11     pptr.setAsInvalid();
12
13     m_RcItem->m_pPage1 =
14             PageListManager::getpFirstPartiallyFreePageArray(blockSizeIndex);
15     flush(&m_RcItem->m_pPage1);
16
17     if (m_RcItem->m_pPage1.isNull())
18     {
19         m_RcItem->m_pPage1.setAsInvalid();
20         flush(&m_RcItem->m_pPage1);
21
22         m_RcItem->m_pSegment1.setAsInvalid();
23         flush(&m_RcItem->m_pSegment1);
24
25         m_RcItem->m_Counter = 1;
26         flush(&m_RcItem->m_Counter);
27
28         PageListManager::popFreePage(m_RcItem->m_pPage1,
29                                     m_RcItem->m_pSegment1,
30                                     m_RcItem->m_SegCounter);
31
32         m_RcItem->m_pPage1.toPtr()->initFreeBlockList(
33                             PREDEFINED_BLOCK_SIZES[blockSizeIndex]);
34
35         if (m_RcItem->m_pPage1.toPtr()->getNumBlockEntries() > 1)
36             // 1 block will be allocated in the step2, so it would make
37             // no sense to push in the partially free list a page containing
38             // only 1 block, because it would be removed from it in step3.
39         {
40             PageListManager::pushPartiallyFreePageNoReset(m_RcItem->m_pPage1);
41         }
42     }
43  }
```

FIG. 4

MEMORY ALLOCATION AND RECOVERY STRATEGIES FOR BYTE-ADDRESSABLE NON-VOLATILE RAM (NVRAM)

CROSS REFERENCE TO RELATED APPLICATIONS

This application claims the benefit of U.S. Provisional Application No. 62/183,100 filed on Jun. 22, 2015, and entitled "MEMORY ALLOCATION AND RECOVERY STRATEGIES FOR BYTE-ADDRESSABLE NON-VOLATILE RAM (NVRAM)", which is hereby incorporated herein by reference in its entirety.

FIELD

This application relates to memory allocation and memory recovery for systems using non-volatile RAM (NVRAM) as well as the testing of NVRAM-based software.

SUMMARY

The detailed description presents innovations in memory management and data recovery for systems that operate using storage class memory (SCM), such as non-volatile RAM (NVRAM). The disclosed innovations have particular application to production database systems, where reducing database downtime in the event of a system crash is highly desirable.

Embodiments of the disclosed technology can address a variety of problems that exist during a system crash. For example, embodiments of the disclosed technology can be used to address the loss of the physical memory mapping and/or the loss of the CPU cache that typically occurs in the event of a system crash. Furthermore, embodiments of the disclosed technology can be used to prevent data inconsistency and/or memory leak problems that may arise in the event of a system crash. Particular embodiments concern an efficient and crash safe memory management system for NVRAM. For instance, the memory management system of certain embodiments uses an efficient, persistent, and crash safe allocator for NVRAM.

Further embodiments involve simulation used to test the crash safety of an NVRAM. For example, in certain examples disclosed herein, execution of code of a program that uses NVRAM for data storage is simulated using a simulator that does not itself use NVRAM. The simulation can be implemented, for example, by one or more processing devices. In particular implementations, the act of simulating of the program comprises: executing the code of the program in a parent process; and, when execution of the code of the program calls for creation of one or more segments of NVRAM, creating original one or more segments of memory in volatile random access memory (RAM) and also creating corresponding one or more copies of the segments of the memory in the volatile RAM. The act of simulating of the program can further comprise, when a cache memory line at an address is flushed in accordance with the code of the program, copying data from the flushed address to the copy of the segment. Additionally, the act of simulating of the program can further comprise, during execution of the code of the program, randomly calling a crash function. Still further, the act of simulating of the program can further comprise, upon calling the crash function: pausing execution of the code of the program by the parent process; creating a second copy of the copy of the segment; and creating a child process that executes a copy of the code of the program using the second copy of the segment and attempts to recover normal execution of the program. In particular implementations, the child process executes the copy of the code of the program independent of the paused execution of the code of the program by the parent process. Further, in certain implementations, the child process operates using the second copy without modifying the original segment, thereby testing whether the child process can recover from the crash function without disturbing the original segment. Upon the child process recovering from the crash functions, operation of the parent process can be resumed.

In other example embodiments disclosed herein, a specialized memory allocator is configured to assign portions of non-volatile RAM (NVRAM) for use by a program. The memory allocator can be implemented, for example, by one or more processing devices. In such embodiments, the memory allocator operates by: writing first data to a memory allocator microlog, the first data including a first state ID indicating that the memory allocator is in a first state; performing a first memory allocation operation, the first memory allocation operation corresponding to the first state; writing second data to the memory allocator microlog, the second data replacing the first data and including a second state ID indicating that the memory allocator is in a second state; and performing a second memory allocation operation, the second memory allocation operation corresponding to the second state. In particular implementations, the memory allocator microlog is a data object that stores information for recovering the memory allocator in the event of a crash without storing an accumulating record of operations performed by the memory allocator. For instance, the memory allocator microlog can be used to recover the memory allocator without data inconsistencies and memory leakage in the event of a crash. In certain implementations, the memory allocator microlog is stored persistently in the non-volatile RAM (e.g., in a segment of the non-volatile RAM at a predefined offset). In some implementations, the first data further comprises copies of one or more variables that are modified during the first memory allocation operation. In particular implementations, the first data further comprises one or more of: (1) a copy of the segment counter involved in the first memory allocation procedure; (2) a variable indicating whether the first memory allocation procedure is an allocate or deallocate procedure; (3) a number of bytes involved in the first memory allocation procedure; (4) a persistent pointer to a page involved in the first memory allocation procedure; (5) a persistent pointer to a segment involved in the first memory allocation procedure; and/or (6) a persistent pointer to a persistent memory location (e.g., a persistent pointer) owned by the data structure that requested memory, where the allocator can write the persistent address of the allocated memory.

Other example embodiments disclosed herein include a system comprising: a non-volatile random access memory (NVRAM); one or more processing devices; and a memory allocator configured to operate with a program being executed by the one or more processing devices and to allocate one or more portions of the NVRAM for use by the program, the memory allocator being further configured to maintain and continuously update a recovery object persistently stored in the NVRAM, the recovery object storing data sufficient to recover a current state of the memory allocator in case of a system crash that interrupts operations performed by the memory allocator. In particular implementations, the memory allocator is configured to allocate unique portions of the NVRAM for use by the program, the unique portions not being used by any other program of the system. In certain implementations, the memory allocator, when first called by the program, performs a memory initialization process in which the memory allocator pre-allocates memory blocks of the NVRAM for use by the program. In such implementations, the pre-allocated memory blocks have predefined sizes. Further, the pre-allocation of memory blocks performed by the memory initialization process can be performed without external knowledge of sizes of memory blocks actually used by the program. In particular implementations, the recovery object stores data for use in a recovery procedure for the memory allocator without storing an accumulating record of operations performed by the memory allocator. In certain implementations, the recovery object stores any one or more of: (1) a state ID identifying a current state of operation for the memory allocator; (2) a copy of the segment counter involved in a current memory allocation procedure; (3) a variable indicating whether the current memory allocation procedure is an allocate or deallocate procedure; (3) a number of bytes involved in the current memory allocation procedure; (4) a persistent pointer to a page involved in the current memory allocation procedure; (5) a persistent pointer to a segment involved in the current memory allocation procedure; and/or (6) a persistent pointer to a persistent memory location (e.g., a persistent pointer) owned by the data structure that requested memory, where the allocator can write the persistent address of the allocated memory. In certain implementations, the system further comprises a memory cache in communication with the one or more processing devices and the NVRAM, the memory cache being configured to temporarily store data before the data is persistently stored in the NVRAM in accordance with instructions provided by the one or more processing devices, the memory cache consisting of volatile memory.

The innovations can be implemented as part of a method, as part of a computing device or database system configured or programmed to perform any embodiment of the disclosed techniques, or as part of a tangible computer-readable media storing computer-executable instructions for causing a computing device to perform any embodiment of the disclosed techniques. The innovations can be implemented as part of a method or system in which one or more programs use embodiments of the disclosed memory allocators for using NVRAM and performing program and memory recovery for the NVRAM in the event of a system or program crash. The various innovations can be used in combination or separately The foregoing and other objects, features, and advantages of the invention will become more apparent from the following detailed description, which proceeds with reference to the accompanying figures.

BRIEF DESCRIPTION OF THE DRAWINGS

FIG. 4 is a code portion illustrating how one example of a recovery item can be used.

DETAILED DESCRIPTION

1. General Considerations

Figure 1:
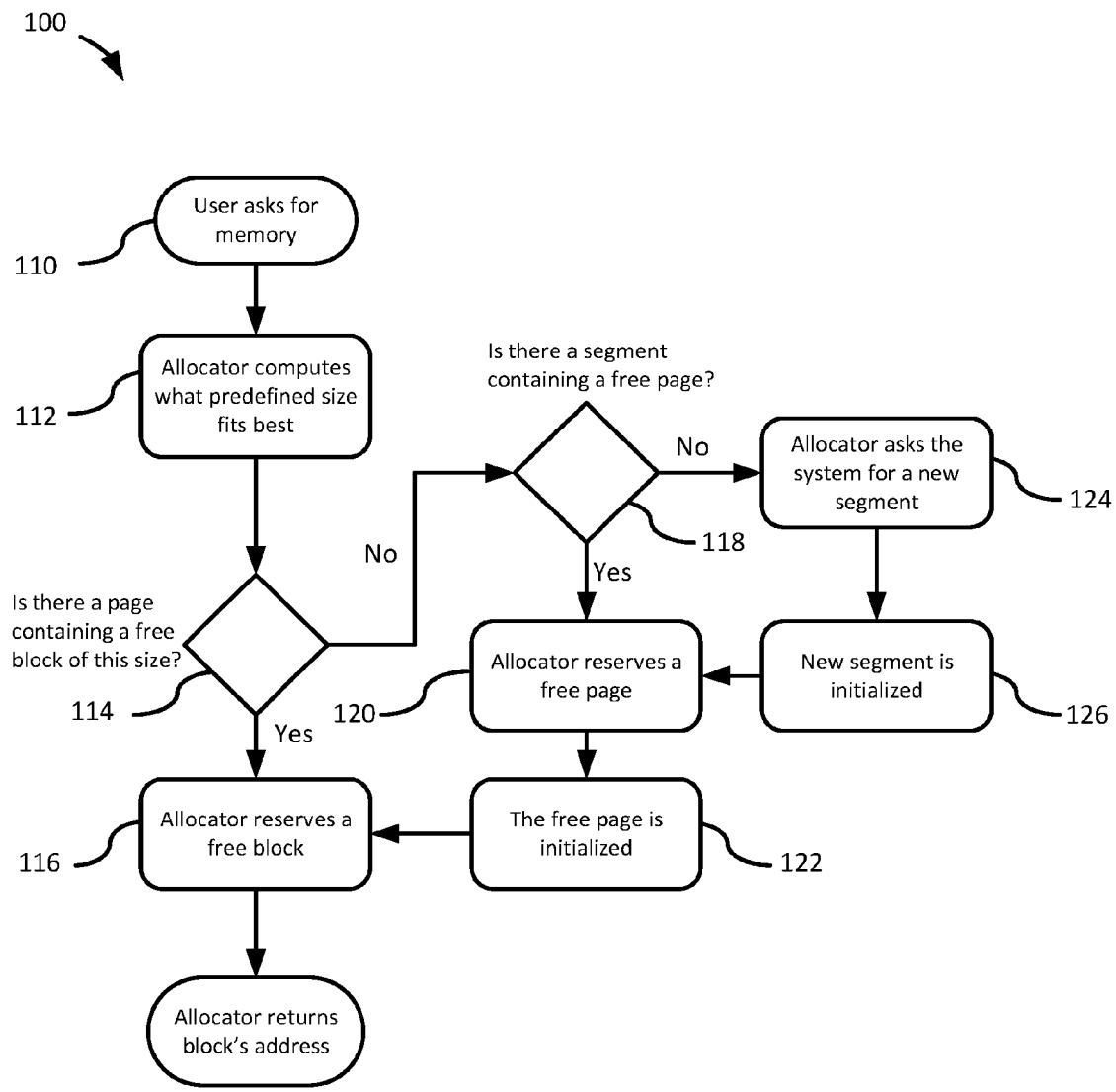
FIG. 1 is a schematic block diagram illustrating an example allocation procedure according to an embodiment of the disclosed technology.

Disclosed herein are representative embodiments of methods, apparatus, and systems for performing memory management and data recovery for systems that operate using storage class memory (SCM), such as non-volatile RAM (NVRAM). The disclosed innovations have particular application to production database systems, where reducing database downtime in the event of a system crash is highly desirable.

The disclosed methods, apparatus, and systems should not be construed as limiting in any way. Instead, the present disclosure is directed toward all novel and nonobvious features and aspects of the various disclosed embodiments, alone or in various combinations and sub-combinations with one another. Furthermore, any features or aspects of the disclosed embodiments can be used in various combinations and sub-combinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "evaluate" to describe the disclosed technology. These terms are high-level abstractions of the actual operations that are performed. The actual operations that correspond to these terms may vary depending on the particular implementation and are readily discernible by one of ordinary skill in the art.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems discussed herein. A given technique/tool may use one or more of the innovations disclosed herein but not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

2. Introduction to Disclosed Technology

Byte-addressable Non-Volatile RAM (NVRAM) is a form of storage class memory (SCM) that promises to make a significant impact in the information technology (IT) industry. In general, NVRAM is a memory technology that exhibits similar characteristics to DRAM while being non-volatile. In other words, it is a RAM that is able to retain data even when not powered.

Embodiments of the disclosed technology include database systems (e.g., production database systems) that use NVRAM as a replacement for RAM (e.g., as a DRAM replacement) or as a replacement for both RAM and the traditional non-volatile storage mechanism (e.g., hard drives). Certain embodiments may still use hard drives for other purposes, but employ NVRAM as the primary persistent data storage technology for particular applications (e.g., for one or more database applications). The use of NVRAM can significantly improve database performance in terms of throughput and response time. Use of NVRAM for primary storage can also significantly improve restart performance, a shortcoming of traditional main memory database systems. Further, by using NVRAM, the traditional log used with persistent databases that use traditional non-volatile storage mechanisms can be avoided. Instead, the persisted data can be updated in place. For instance, the persisted data can be updated continuously as data changes and in substantially real-time. As a result, a database system using NVRAM can achieve restart times of a few seconds independent of instance size and transaction volume without significantly impacting transaction throughput. This combination of fast recovery and competitive performance makes the use of NVRAM well suited for database purposes.

Disclosed herein are various systems, methods, and apparatus for operating and managing NVRAM (e.g., in a production database system). Particular embodiments concern an efficient and crash safe memory management system for NVRAM. For instance, the memory management system of certain embodiments uses an efficient, persistent, and crash safe allocator for NVRAM.

The disclosed technology can be used in combination with any of the various architectures, tools, and techniques disclosed in U.S. patent application Ser. No. 14/555,419 entitled "A Hybrid SCM-DRAM Transactional Storage Engine for Fast Data Recovery" and filed on Nov. 26, 2014, which is hereby incorporated herein by reference in its entirety.

The disclosed technology can also be used in combination with any of the various architectures, tools, and techniques disclosed in Oukid et al., "SOFORT: A Hybrid SCM-DRAM Storage Engine for Fast Data Recovery," *DaMoN '14 Proceedings of the Tenth International Workshop on Data Management on New Hardware* (2014), which is also hereby incorporated herein by reference in its entirety.

2.1 NVM and NVRAM, Generally

Non-Volatile Memory (NVM) generally refers to any kind of memory technology that retains data in the absence of power (e.g., hard disk drives (HDD) or optical discs). In general, NVM has a read and write latency that is orders of magnitude higher than the latency of Volatile Memory, such as DRAM. However, new types of NVM with speed and capacity characteristics similar to those of DRAM are becoming available. This new type of memory, referred to herein as Non-Volatile RAM (NVRAM) is fast enough to be accessed directly from a CPU (e.g., using load/store semantics through the CPU cache).

Embodiments of the disclosed technology include hybrid systems that use both DRAM and NVRAM or systems that use NVRAM exclusively.

Non-Volatile memory has several possible advantages over other approaches, any one or more of which can be realized in embodiments of the disclosed technology. For example, in certain in-memory database systems (e.g., SAP HANA), the system keeps a working copy of the data in the RAM (which alleviates the I/O bottleneck of traditional disk-based databases) and a durable copy of the data on a traditional hard drive. This approach, however, can take up to one hour or several hours to start because of the large amount of data to load from the hard drives to the RAM. Such long restart times directly impact the availability of the database, which has a significant impact on the businesses.

NVRAM can be used to remedy this drawback. In hybrid systems, for example, data would be mainly kept in the NVRAM, so after a crash or a normal restart, the data is still in memory and the system just needs to check quickly its consistency, possibly finishing or rolling-back unfinished operations, before being fully operational again. Thus, using NVRAM, the system would keep the same or substantially the same execution speed while being able to restart almost instantly, independently of its size.

2.2 Memory Management Considerations

NVRAM is highly beneficial to database systems but desirably uses a specialized memory management system. The first subsection below explains how memory is managed in standard volatile systems, and the second subsection explains why NVRAM cannot be managed in the same way.

2.2.1 Standard Volatile Memory Management

Programs do not work directly with the physical addresses they are using in memory, but instead work with virtual addresses in virtual memory. So, when asked for n bytes of memory by a program, a memory allocator looks for n contiguous free bytes in the physical memory, and returns corresponding virtual addresses for use by the program.

Typically, for a standard volatile memory management system, the virtual memory of each program is mapped to the physical memory and the mapping is stored in a data structure called Page Table, which is maintained in volatile memory. Thus, after restarting the system (e.g., upon a crash), the old mapping is lost and a new one is created for the program. Further, the CPU does not always write back in memory the data currently used by programs, but instead keeps the data in the CPU's data cache as long as the CPU needs the data.

Thus, in a standard volatile memory system, the data lost on system failure includes: (1) the data stored in the RAM; (2) the data stored in the CPU caches; and (3) the memory mapping stored in the page table

2.2.2 Issues with Applying Standard Volatile Memory Management to NVRAM

If NVRAM is used instead of RAM, when a crash occurs, there is no loss of data in the NVRAM. However, when a crash occurs, the content of the caches and the previous memory mapping of physical memory to virtual addresses are lost. Thus, in the event of a crash in a system using NVRAM, there are typically two issues to address: (1) the loss of the physical memory mapping; and (2) the loss of the content in the CPU caches.

The Loss of the Physical Memory Mapping.

When a program is restarted, it should continue from the state it was in when the system crashed. To do so, a program desirably finds the old values of its variables, which is difficult (if not impossible) without the mapping giving the physical addresses where they are stored. Furthermore, it is not certain that the program will use the same virtual addresses for its variables, which makes it even more difficult to link the variables of a program to their old physical addresses. So, keeping data in the NVRAM if one cannot find which byte corresponds to what is pointless.

The Loss of the Contents of the CPU Caches.

The CPU keeps in its caches the most accessed memory lines and usually writes them back in the RAM on a least recently used basis when it needs to fetch other lines. The CPU has its own strategy to flush cache lines, which is not typically known by a programmer or over which the programmer has little to no control. Further, the CPU's strategy can change from CPU to CPU, making it unpredictable. While a line is in cache, every change that it undergoes stays in the cache and is not written in RAM. Such changes will be lost if a crash happens. Several types of problems can result as a consequence, including data inconsistency and memory leaks, which are discussed in more detail below.

Data Inconsistency:

Data is often a part of a set that should have global coherence. If a part of the set is modified and a crash occurs before the other part is modified, the system will not be in a consistent state after restarting. For example, assume that A is a point of a circle of center (0, 0) and of radius 1; and x and y are the Cartesian coordinates of A. According to Pythagoras' theorem, one should always have $\sqrt{x^2+y^2}=1$. Now, imagine that one wants to reset A as follows:

1 //Reset A
2 A_x=1;
3 A_y=0;

If the system crashes between lines 2 and 3, or if it crashes after line 3, but only x has been flushed from the cache memory, then, in the NVRAM, y still has its old value whereas x has the new one, which is not compatible with Pythagoras' theorem.

Memory Leaks:

If a program asks the system for memory space via a memory allocation function (such as with a call to malloc(x) in C/C++), and crashes after the system reserved the memory space, but before the pointer to it is flushed back in the NVRAM, then after restarting the system the memory is still allocated but the pointer is lost. Thus, the memory space is allocated but never used, leading to a "memory leak". Furthermore, the memory being persistent, memory leaks are also persistent because restarting the system doesn't affect them, so they will add up over time.

3 Example Memory Allocation and Recovery Embodiments

This section describes example embodiments for addressing the issues identified above that can be present when NVRAM is used as either a RAM replacement or as a replacement for both RAM and traditional storage devices (e.g., hard drives). The disclosed embodiments should not be construed as limiting in any way, as any feature or aspect of the disclosed technology can be used alone or in combination with one or more other features or aspects disclosed herein.

As described in the previous section, for a hybrid system using both volatile and NVRAM or for a system using non-volatile memory exclusively, there are several issues that can be present in such systems. To address these issues, any one or more of the following innovations can be used: (1) a persistent memory mapping to keep track of data even after restarting; and/or (2) a recovery procedure at restart time to prevent memory leaks and data inconsistency. Particular embodiments of these innovations are described in more detail below. These innovations fundamentally change the way memory is managed and allocated and are specially and uniquely adapted for use in systems using SCM (e.g., NVRAM).

In order to facilitate the persistent memory mapping and/or recovery innovations disclosed herein, certain embodiments of the disclosed technology employ a memory organization and management scheme that is specially adapted for database applications and that provides a foundation on which embodiments of the persistent mapping and recovery procedures operate. The particular memory organization and management scheme disclosed below, however, should not be construed as limiting, as other memory organization and management schemes can be used.

3.1 Example Memory Organization and Management 3.1.1. Example Allocation Strategy As discussed previously, standard memory management tools are not appropriate for NVRAM systems. Instead, specialized memory allocators in accordance with embodiments of the disclosed technology can be used. In one example embodiment, a Slub-like memory allocator is used. In this embodiment, the allocation strategy is to pre-allocate memory blocks of predefined sizes and to keep them in a list for each size. Then, when memory is requested from the allocator, the memory allocator finds the predefined size that best fits the amount of bytes requested and returns one of the blocks of the corresponding free block list. When the memory is de-allocated, the containing block is returned to the free block list corresponding to its size.

Among the advantages that can be realized using this strategy are any one or more of the following: (1) it is extremely fast because it does not need to ask the kernel to find a suitable memory space, past the first pre-allocations; and/or (2) it greatly reduces the memory fragmentation since all blocks are already pre-allocated However, one possible drawback is that the pre-allocated memory is lost from the system's point of view: it is not used, and the system cannot use it. But, in the context of using the NVRAM for databases and database applications, this is not a problem because database applications will be the primary (or perhaps only) programs that run on the system and use the NVRAM, so no other program will request memory. Or, this strategy can be employed for a portion of the NVRAM, leaving the remaining portion available for use by the system generally.

3.1.2. Memory Organization

This subsection describes one example memory organization scheme for use in embodiments of the disclosed technology. In the example memory organization scheme, the NVRAM is subdivided into three categories: segments, pages, and blocks. Example details of these categories are disclosed below, though it should be understood that the scheme presented can be modified from implementation to implementation without departing from the principles of the disclosed technology.

Segment: a segment is the upper memory entity. In the example embodiment, a segment comprises a header containing some meta-data and the rest is divided into pages.

Page: a page comprises a header of meta-data, a block entry for each block in the page (containing some meta-data about the respective block), and the rest is divided into blocks. In the example embodiment, blocks in a page (e.g., all blocks in a page) have the same size.

Block: a block is the elementary memory unit whose address is returned by the allocator In certain embodiments, a special segment referred to herein as "Segment Zero" is included among the segments. Segment Zero can comprise, for example, one or more of: a list of every segment containing at least one free page (a page containing no allocated block); a list of partially free pages (pages containing at least one free block) for each predefined block size; and/or some other information. Additional details concerning the contents of Segment Zero are discussed below in more detail.

3.1.3. Example Allocation Procedure

FIG. 1 illustrates one example allocation procedure. This particular embodiment should not be construed as limiting, as the disclosed method acts can, in some cases, be performed alone, in different sub-combinations with one another, in different orders, or at least partially simultaneously with one another. Further, any of the disclosed methods or method acts can be performed with any other methods or method acts disclosed herein.

According to one example embodiment, when the allocator is asked for memory (process block 110), it will compute first what is the predefined block size that fits best the requested amount of bytes (process block 112). Then, the allocator will determine if there is a page containing a free block of the desired size (process block 114). If so, the allocator will reserve and return a block of the corresponding block size from the corresponding page in the partially free pages list (process block 116). If the corresponding list is empty, the allocator will determine if there is a segment containing a free page (process block 118). If so, the allocator will reserve a page from a segment in the segment list (process block 120) and push it in the corresponding partially free page list. The page is then initialized (process block 122), and the requested block(s) are reserved (process block 116). And, if the segment list is empty, then the allocator will ask the system for a new one (process block 124). The new segment is then initialized (process block 126), page(s) allocated and initialized (process blocks 120, 122), and the requested block(s) reserved (process block 116).

3.2. Persistent Mapping

As discussed above, standard volatile memory mapping is not suitable for use in a NVRAM-enabled file system. For an NVRAM system, and in certain embodiments of the disclosed technology, a persistent mapping scheme is used to keep track of data, even after changes might have occurred in the virtual memory mapping.

In an NVRAM-enabled file system, and in one example embodiment of the disclosed technology, chunks of memory are reserved and assigned a unique name. Then, knowing the name of a chunk, its physical address can be found. In accordance with the memory organization introduced above, these chunks correspond to segments: the upper memory entities. In particular implementations, no data is written outside of a segment. Further, segments have the same size (e.g., all segments have the same size), and they are identified uniquely by a number, their ID. When the system restarts, each segment's physical address is retrieved by the NVRAM-enabled file system, and then is mapped to a new virtual address (e.g., by calling a memory mapping function provided by the operating system (such as mmap in Linux or equivalent function)).

By using this scheme, all that is needed to retrieve a byte of data after restarting is the ID of the segment containing it, and the local offset of the byte in the segment. This information can be stored in a so-called "persistent pointer". A persistent pointer to a byte of data (a block) can comprise the set of: (1) a segment ID; and (2) an in-segment offset.

When used with the mapping between the segments' physical and virtual addresses, the persistent pointers allow the memory management system to keep track of any byte of data, independently of virtual mapping changes.

Notably, this mapping works in two directions: (1) given a virtual address, the ID of the segment (if it exists) can be found; and (2) given a segment ID, its virtual address can be found.

This recovery ability is demonstrated by the following example that illustrates how persistent mapping works in accordance with an embodiment of the disclosed technology:

Consider a situation where the system restarts after a crash. Each pre-existing segment is retrieved in the NVRAM and is mapped to the virtual memory. A program using the disclosed memory allocation scheme needs the virtual address of the variable X in order to use it, but only has a persistent pointer to it, whose ID, for example is 4 and offset is 1024. The program (or a function called by the program) can simply compute the virtual address of X by finding the virtual address of the segment 4 in the mapping, and adding 1024 to it.

In order to use the persistent pointers (e.g., in order for a program to use the persistent pointers), the mapping of the segments is desirably updated and some meta-data restored at each start of the system. Also, it is desirable to check the content of the memory after each crash in order to prevent data inconsistency and memory leaks.

To accomplish these tasks, a recovery procedure (e.g., a recovery procedure unique to each program that crashed) can be performed at each start of the system or after a program crash. One example recovery procedure comprises one or more (e.g., all) of the following operations: (1) recover Segment Zero and its metadata; (2) remap the pre-existing segments; (3) recover the allocator; and/or (4) recover the user's structures. In particular example implementations, these operations are performed in the illustrated order, though the operations can, in some cases, be rearranged, performed with other procedures, and/or performed alone or in different sub-combinations with one another. These operations are discussed in more detail in the following paragraphs.

Recover the Segment Zero and its Meta-Data.

In particular implementations, the first action performed is recovering the Segment Zero. Among its meta-data is the counter of segments. In certain implementations, the segment IDs are assigned increasing values starting from "1". Thus, the segment counter is enough to know how many segments must be remapped, and what the IDs of the segments are. Because a crash is possible between the creation of a new segment and the increment of the counter, it is desirable to evaluate whether this situation exists in order to avoid a memory leak. Each meta-data in the Segment Zero has a fixed offset, so once that the Segment Zero has been mapped its content is directly usable.

Remap the Pre-Existing Segments.

As discussed above, in order to use the data stored in the NVRAM, the pre-existing data stored in the NVRAM is remapped to virtual memory (e.g., by calling a memory mapping function provided by the operating system (such as mmap in Linux or equivalent function)). When the remapping is complete, the issue of recovering the loss of the memory mapping is addressed.

Recover the Allocator.

As discussed above, other issues that are desirably addressed by the recovery procedure are the data inconsistency and memory leaks caused by the loss of the CPU caches. To address these issues as part of the example recovery process, the memory allocator is recovered. As part of recovering the memory allocator, if an allocation or a deallocation was interrupted by a crash, it is rolled back or forward. To do so, each function of the allocator can have a corresponding recovery function. The main recovery function of the allocator is called during the recovery procedure, and if it detects that an inner function has been interrupted during the execution of its original corresponding function, it will call the recovery function of the inner function interrupted, which will do the same verifications, and so on. Example embodiments for performing such recovery functions are discussed below and illustrated in FIG. 5.

Recover the User's Structures.

The data of the user is also desirably recovered as part of the recovery process. To do so, persistent data structures (e.g., all persistent data structures) of the user can be referenced in a global structure in the NVRAM stored at a predefined offset in the Segment Zero. The global structure can comprise persistent pointers identifying each user data structure according to its segment ID and offset. For instance, in some example embodiments, the global data structure is a set of data structures and/or persistent pointers to data structures. This global data structure can be defined by the user (e.g. the person writing the main( ) program and using the persistent allocator as disclosed herein). For instance, at the beginning of the program, the user allocates a chunk of persistent memory so the user can write his global data structure in it (in some example implementations, this chunk of memory is not allocated in Segment Zero, but most likely in Segment 1 since it should be the first allocation of the program). Then, the user updates a persistent pointer stored at a predefined offset in the Segment Zero, so this persistent pointer points toward the newly allocated global data structure. So, when the system restarts, all data structures can be retrieved using the global data structure; further, the global data structure can be retrieved because its persistent address is stored at a predefined offset in the Segment Zero. Consequently, the user's data can be easily retrieved, and the recovery functions of the data structures can be called to ensure their consistency.

After these operations are performed, the program using the memory is desirably resumed in a state consistent with the recovered data. Further, the user programming the program should be aware that the result of the recovery program (e.g., whether it will be rolled back or forward) is unpredictable and adapt his or her program accordingly.

4. Example Implementations

This section presents example implementations of a memory allocator, recovery process, and crash test simulator that can be used to implement aspects of the disclosed technology. The first subsection, for example, describes an exemplary set of classes and functions that can be used in an implementation of the disclosed technology, the second subsection details several unique features that can be implemented in embodiments of the disclosed technology, and the third subsection explains how a programmer can use the example memory allocator in a program.

4.1. Example Classes

In certain example implementations of the disclosed technology, one or more of the following classes are used:

BlockEntry: this represents the meta-data structure describing a block, written in memory after the header of each page, one for each block. It informs if its corresponding block is allocated, and what is the next block in the free block list if it is not allocated.

PLogicalPage: this represents a page in the NVRAM and comprises a page header structure and some functions to manage the blocks in it.

PSegment: this represents a segment in the NVRAM and comprises a segment header structure and some functions to manage the pages in it.

PPtrBase: this is the base of any persistent pointer and comprises a segment ID and an in-segment offset (as explained previously) but has no information about the type of data it points to.

PPtr: This is the persistent pointer and is likely commonly used. It inherits from PPtrBase and is a template class: it is aware of the type of data it points to, just like a normal pointer. So it returns the correct type of pointer when it is translated (for example, PPtr<int>.toPtr( ) will return a int*).

PageListManager: This comprises an array of partially free page lists—one for each predefined size of block—and some functions to manipulate them.

SegmentListManager: This comprises a list of every free or partially free segment, some functions to manipulate them, and/or some functions to create segments. The later functions can be especially useful as they ask directly the system for memory and thus should be crash-safe to prevent any memory leak.

SmallPAllocator: This is the persistent allocator of small blocks. It can perform any one or more of three main functions: allocate a small block of memory, deallocate one, and/or recover. This is the upper recovery function of the allocator, which starts the recovery procedure in the allocator after a crash.

PAllocator: This is the persistent allocator manipulated by the user. It comprises the small block allocator (SmallPAllocator) and further comprises a medium block allocator and a big block allocator. It is configured to select the best allocation strategy depending on the amount of bytes asked by the user. Its main function is to redirect the user's calls.

PAllocatorAnchor: This is a data structure useful to the recovery procedure and is written in the Segment Zero. It comprises one or more of the page list manager, the segment list manager, and/or a persistent pointer to the main data structure of the user that comprises the user's data. This data structure is the Point of Entry. There is only one instance of PAllocatorAnchor, common to all allocators in the system.

PMSystemManager: This is a central object, managing the persistent memory and especially the Segment Zero. One of its functions is initPM( ), which initializes or recovers the persistent memory, and informs a program of the user if it is starting for the first time or after a crash.

FlushManager: This comprises a flush function (e.g., the function Flush(void* address)), which helps ensure that the cache line containing the given address has been written back in the NVRAM before executing the next instruction.

RcItem: This is the Recovery Item. There is one Recovery Item for each allocator, stored in the Segment Zero. It comprises information used by an allocator to recover (e.g., all necessary information for an allocator to recover), such as one or more of: the current state of the allocator and/or the variables of an allocator's function being executed. A Recovery Item is desirably updated constantly as its corresponding allocator is running Singletons: This class provides a few functions used for the creation of the persistent mapping and for the simulation of NVRAM.

CrashSimulator: This class provides a function simulating a crash of the system and can be used to test the recovery procedure.

RecoveryCopyManager: This class helps to simulate the flushes so as to make them compatible with the simulations of NVRAM and crashes.

PVector: This is an implementation of a classic C++ vector using NVRAM and an embodiment of the disclosed allocator. Thus, it is not part of the allocator. As a persistent data structure, it contains a recover function (e.g., recover( )). So even if it implements only a few features of the original vector class, it allows to simulate a complete recovery procedure.

It is to be understood that these classes, class names, and specific behaviors described are by way of example and not limitation. Instead, other classes having different names and potentially also modified behaviors can be used to realize embodiments of the disclosed technology.

4.2. Further Discussion of Exemplary Features

This subsection provides additional details concerning several of the features introduced above. For example, the subsection describes in more detail: (1) how the NVRAM, the flushes, and the crashes can be simulated in order to provide an environment in which a programmer can effectively test his or her program in the context of using NVRAM in the event of a crash; (2) how the memory is initialized; (3) how the persistent pointers can operate; (4) how the microlog (e.g., how the recovery item RcItem operates); and (5) how persistent vectors operate. Any one or more of these features can be used alone or in combination with another in embodiments of the disclosed technology.

Further, the discussion below proceeds with reference to the example classes and functions introduced above. These references are for example purposes only and are not to be construed as limiting. Instead, the principles of operations underlying the disclosed examples can be generally applied to NVRAM systems and program testing environments for such systems which use other classes and functions, all of which are considered to be within the scope of the disclosed technology.

4.2.1. NVRAM Simulation

Shared memory (RAM) can be used to simulate NVRAM. For example, a program can create a block of shared memory and give it a name. Then, the shared memory remains available even if the process that created it is terminated, and is accessible from any other process. So, in this example, the shared memory behaves just like NVRAM, as long as the crash simulation does not involve an actual shutdown of the system, but just a stop of the main process.

In one example implementation, a segment of memory is created by a call to a shared memory provider function. For instance, in one example implementation, a segment of memory is created by a call to sharedMemProvider.open (persMemName, bs, flags, rc), where sharedMemProvider is an interface manipulating directly the shared memory, persMemName is the name which will identify uniquely the segment to create, bs is the size of the segment to create, flags specifies some information (such as if the segment must be created or if any process can access it), and rc receives the error code if the call to open( . . . ) fails. Then, a call to retrieve a virtual address from the provider can be performed. For instance, in one example implementation, a call to sharedMemProvider.getAddress( )) will return the virtual address to which the created segment is mapped. If the name of a pre-existing segment of shared memory is known, one can re-open it and get its address by using almost the same code, one just needs to change the flags.

4.2.2. Crash and Flush Simulation

In order to verify that a program can recover correctly, whatever its state, when a crash occurs in an NVRAM system as disclosed herein, it is desirable to simulate crashes systematically. For instance, it is desirable to simulate crashes systematically in critical parts of the codes (e.g., every critical part of the code) and without altering the content of the main program so as not to have to restart it after each crash simulation.

Figure 2:
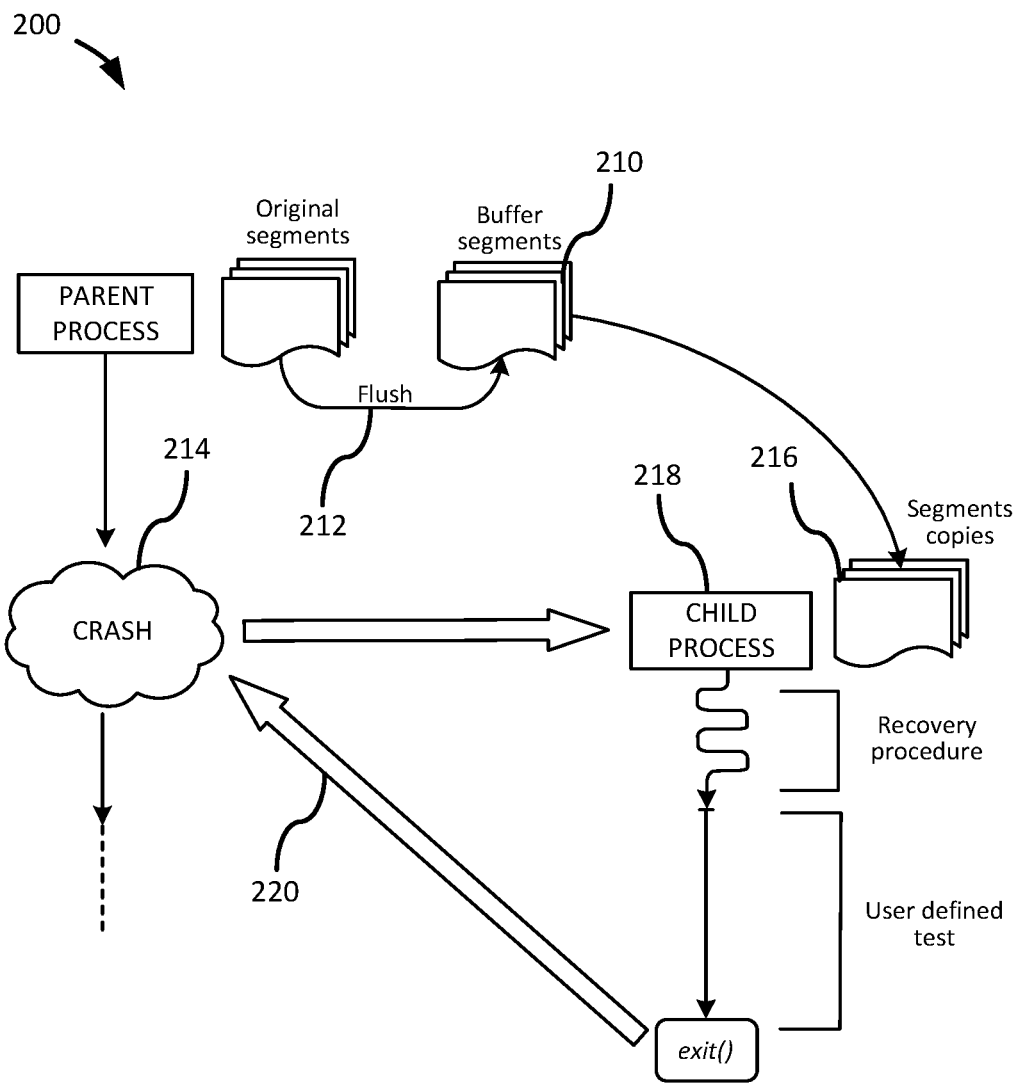
FIG. 2 is a schematic block diagram illustrating an example crash and flush simulation method.

Disclosed below is an example implementation of a crash and flush simulation that can be effectively used to simulate a crash and its recovery without stopping the original program. The example implementation can be used to simulate the case of a power failure. This embodiment can be especially useful because it allows a programmer to test automatically the crash-safety of a program in as many states as desired. In the example implementation, which is also illustrated by schematic block diagram 200 in FIG. 2, one or more of the following method acts can be performed:

1. When a segment is created, a corresponding buffer segment is also created (shown at 210).

2. When the cache line at an address is flushed (e.g., every time a cache line at an address is flushed), it is copied from the original segment to the same offset in its corresponding buffer segment (shown at 212). So, only the flushed memory lines are present in the buffer segments. Hence, the buffer segments represent the state of the original segments in case of a power failure.

3. A crash function is randomly called between critical sections of the program (e.g., each critical section of the program) (shown at 214). This crash function pauses the original process, creates a copy of each buffer segment (shown at 216) and creates a new process executing the same program, associated with the segment copies (shown at 218). This new process will then start the recovery procedure as would have done the parent process if it crashed where it is paused, with only the memory lines that have been flushed (which simulate the loss of the CPU caches) and does not modify the content of the original segment. Or, in other embodiments, the new process is another program whose purpose is to check the consistency of the data.

4. After the child process finishes the recovery procedure and the rest of the program, the main program resumes and continues until the next crash simulation happens (shown at 220).

In an environment with real NVRAM, an example flush function (here, Flush( ) can be implemented as follows:

1 // All previous instructions must have been executed by the processor
2 // before it can load those following _mm_sfence( )
3 _mm_sfence ( );
  _mm_clflush (address); // This instruction is the actual flush
4 _mm_sfence ( );
5 pcommit; // This is a CPU instruction that ensures data has made it to the NVRAM For optimization reasons, a CPU does not always execute the code lines in the written order. Thus, memory barriers (or memory fences) (e.g., as implemented by _mm_clfence( . . . ) shown above) can be used to ensure that the cache memory lines at the flushed address effectively contains the expected value. For the flush simulation, the flush instruction (e.g., as implemented by _mm_clflush( . . . )

shown above) is replaced by a function copying the memory line of the address to its corresponding offset in the corresponding buffer segment.

These example function and instruction names (e.g., Flush( )_mm_clfence( ), _mm_clflush( . . . )) are by way of example only and not to be construed as limiting in any way. Instead, the actual names of corresponding (or equivalent) functions and instructions may vary from implementation to implementation, and on the instruction set provided for a particular CPU architecture and/or memory architecture.

4.2.2. Memory Initialization

In certain example embodiments, memory initialization (e.g., achieved by a memory initialization function (such as, for instance, the function PMSystemManager::initPM( ) is performed at the beginning of program execution (e.g., at the beginning of every program execution). If the program is executed for the first time, the memory initialization function will create and initialize the Segment Zero, which contains data (e.g., all necessary data) to use the persistent memory and the persistent allocator. For example, upon initialization by the memory initialization function, Segment Zero can comprise one or more of: (1) an anchor for the allocator (e.g., PAllocatorAnchor); (2) an array of recovery items, one for each allocator; and/or (3) a bit of initialization.

In particular implementations, each one of these elements is stored at a predefined offset so they can be used as soon as the Segment Zero is mapped. For debugging purpose, there can be different persistent allocators (e.g., different PAllocators), each being identified by its name, so it can be determined which one owns an allocated block. The different allocator names can be an enumeration, used to order the recovery items in the array. In particular implementations, just before returning, the initialization function sets the bit of initialization to "1" so it can know during a potential later recovery if the segment Zero has already been successfully initialized or not.

In certain implementations, if the program is recovering, the initialization function looks for the counter of segments in the anchor for the allocator, remaps them to the virtual memory, and launches the recovery function of each allocator.

Calling the recovery function of the entry structure is the responsibility of the user programming a program that operates using the disclosed memory management embodiment. Calling the recovery function can be performed in the user's program, after the initialization function.

4.2.3. Persistent Pointers

Persistent pointers comprise a segment ID (e.g., type size_t) and an offset (e.g., type ptrdiff_t). To ensure consistency, when a pointer gets a new value, it is advantageous for both members to be written at the same time in the memory. For instance, if they were modified sequentially, a crash could happen between the two modifications. Then, after restarting, the pointer would have an incorrect value, which would be very difficult to detect. An appropriate atomic write command can be used to accomplish this value assignment. For example, in one embodiment, each member is 8 bytes long and an atomic write function (e.g., the function atomic Write( . . . )) can be used to write both values at the same time. Consequently, in this embodiment, the address of each persistent pointer is a multiple of 16.

Also, in one example embodiment, the persistent pointer's function (e.g., toPtr( )) returns the virtual address to which it corresponds. More specifically, this function looks for its segment ID in the persistent mapping, gets the virtual address of it, adds its offset, and returns the result. Correspondingly, it is possible to set a persistent pointer from a virtual address. For example, the persistent pointer's function init(void* address) checks in the persistent mapping if the address corresponds to a segment, and if it does, gets its ID and computes the local offset.

4.2.4. Recovery Management

In certain example embodiments, recovery management involves a recovery item and a recovery procedure.

Recovery Item.

A recovery item is an object continuously used by the memory allocator to store copies of some variables before modifying them, to keep track of a function parameter, or also to know in which state the allocator is in currently. In particular implementations, the recovery item is stored persistently in the NVRAM. After a crash, the content of the recovery item can be used to roll-back or roll-forward any interrupted operation that was being performed by the corresponding allocator at the time of the crash. For instance, in certain implementations, the recovery item provides all the necessary information to roll-back or roll-forward any interrupted operation in its corresponding allocator. Therefore, the recovery items serves as a "microlog" for the memory allocator and includes data for recovering the memory allocator in the event of a crash between the beginning of an allocation and the moment the address of the allocated memory is returned to the calling function. Further, the recovery item operates without storing a complete log that accumulates all actions performed by the memory allocator between persistent writes to the non-volatile data store as with traditional systems.

The recovery item can comprise, for example, any one or more of: (1) a state ID identifying a current state of operation for the memory allocator; (2) a copy of the segment counterinvolved in the current memory allocation procedure; (3) a variable indicating whether the current memory allocation procedure is an allocate or deallocate procedure; (3) a number of bytes involved in the current memory allocation procedure; (4) a persistent pointer to a page involved in the current memory allocation procedure; (5) a persistent pointer to a segment involved in the current memory allocation procedure; and/or (6) a persistent pointer to a persistent memory location (e.g., a persistent pointer) owned by the data structure that requested memory, where the allocator can write the persistent address of the allocated memory.

Code portion 400 in FIG. 4 presents one example of how the recovery item can be used. The example in FIG. 4 shows a particularly extensive use of the recovery item, and thus represents a relatively conservative approach in which the number of operations needed to be redone at the time of the crash is reduced. Other embodiments use the recovery item less extensively, and thus speed up the overall operation of the allocator at the potential cost of performing additional recovery operations in the event of a crash.

Recovery Procedure.

As noted, the recovery procedure helps ensure that the memory is usable again, without data inconsistency or memory leak. The first part of it is the call to the initialization function (e.g., initPM( ), and the second is up to the user: to call the recover function of its own persistent data structures, and to make sure that his program will continue where it stopped.

In particular embodiments of the disclosed technology, all data of the user is tracked by persistent pointers stored in the global data structure, to which a persistent pointer in Segment Zero is stored. The persistent pointer to the global data structure in Segment Zero is the entry point (e.g., Point of Entry). The fact that its offset is predefined allows retrieval of all the data of the user. Only one persistent pointer to the global data structure is required for the group of encapsulated data structures.

Figure 5:
FIG. 5 is a code portion illustrating an example recovery procedure using a recovery item.

Code portion 500 in FIG. 5 presents an example recover function corresponding to the previous example. In the example shown in FIG. 5, two different uses of the recovery item are highlighted: the member m_Counter informs of the state of the function when the system crashed, while the other members are copies of variables necessary to continue the execution. Also of note is the kind of encapsulation used in recover functions. For instance, with reference to FIG. 5, in case 1, recoverAllocate calls recoverPopFreePage and recoverPushPartiallyFreePageNoReset because one of these functions might have been interrupted by the crash. And these recover functions might also call other recovery functions, depending on the state they were in, and so on.

Figure 6:
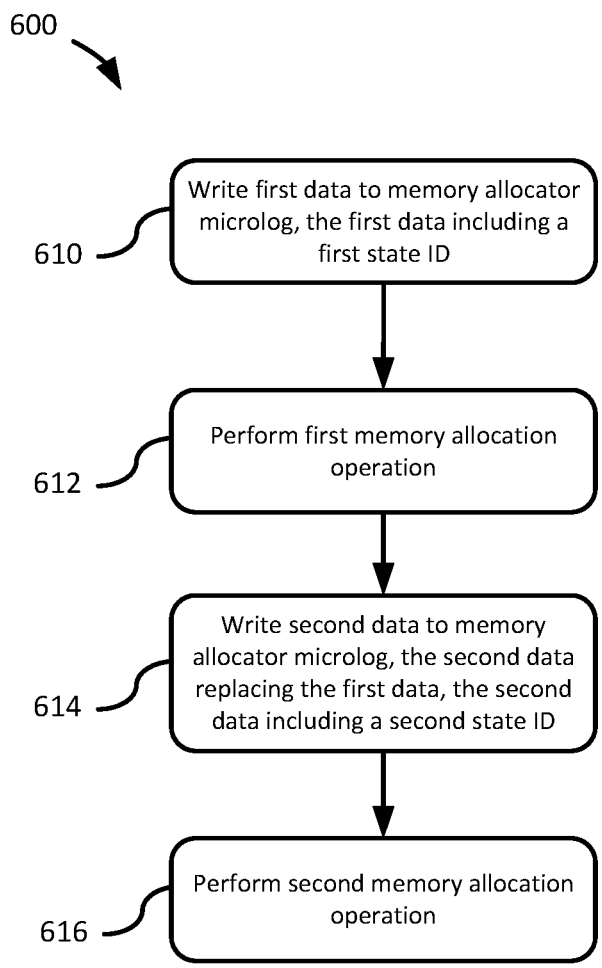
FIG. 6 is a block diagram illustrating an example procedure for using a recovery item in accordance with an embodiment of the disclosed technology.

FIG. 6 is a flow chart 600 illustrating an example usage of the recovery item (microlog). The disclosed embodiment can be performed by a memory allocator (implemented by one or more processing devices) and operating in a system that uses SCM (e.g., NVRAM). For example, the memory allocator can be configured to assign portions of non-volatile RAM (NVRAM) for use by a program. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 610, first data is written to a memory allocator microlog (e.g., the recovery item discussed above). In the illustrated embodiment, the first data includes a first state ID indicating that the memory allocator is in a first state.

At 612, a first memory allocation operation is performed, the first memory allocation operation corresponding to the first state.

At 614, second data is written to the memory allocator microlog, the second data replacing the first data and including a second state ID indicating that the memory allocator is in a second state.

At 616, a second memory allocation operation is performed, the second memory allocation operation corresponding to the second state.

In particular implementations, the memory allocator microlog is a data object that stores information for recovering the memory allocator in the event of a crash without storing an accumulating record of operations performed by the memory allocator. For instance, the memory allocator microlog can be used to recover the memory allocator without data inconsistencies and memory leakage in the event of a crash. In certain implementations, the memory allocator microlog is stored persistently in the non-volatile RAM (e.g., in a segment of the non-volatile RAM at a predefined offset).

In some implementations, the first data further comprises copies of one or more variables that are modified during the first memory allocation operation. In particular implementations, the first data further comprises one or more of: (1) a copy of the segment counterinvolved in the first memory allocation procedure; (2) a variable indicating whether the first memory allocation procedure is an allocate or deallocate procedure; (3) a number of bytes involved in the first memory allocation procedure; (4) a persistent pointer to a page involved in the first memory allocation procedure; (5) a persistent pointer to a segment involved in the first memory allocation procedure; or (6) a persistent pointer to a persistent memory location (e.g., a persistent pointer) owned by the data structure that requested memory, where the allocator can write the persistent address of the allocated memory. The second data can likewise include such variables and additional data in association with the second memory allocation operation.

4.2.5. Persistent Data Structures

Persistent data structures also have the responsibility to maintain the consistency of their data. Indeed, any function manipulating data can be interrupted by a crash, and so, desirably has a corresponding recovery function. This responsibility is transitive. For example, if a data structure asks the allocator for memory, and a crash occurs during the allocation, first the allocator recovers the allocation (e.g., via roll-back or roll-forward) and then it is up to the data structure to recover the function that called the allocation, depending on the result of its recovery.

For example, the persistent data structure can itself comprise a recovery item—different from those of the persistent allocators—but used the same way and for the same reasons as for the allocator. For instance, a persistent vector (and its associated persistent vector class) can be used to allow for this desired manipulation of data.

4.3. Examples Usage of the Disclosed Technologies

For a program that uses NVRAM and manages memory using embodiments of the disclosed memory allocators and their associated recovery functions, several measures can be taken to help improve the use of the disclosed technology in a user's program. In certain example implementations, for example, the following method acts can be used to effectively use embodiments of the disclosed memory allocator:

1. Initialize the persistent memory (e.g., with the function initPM( );
2. Instantiate a persistent allocator;
3. Get a reference to the entry point (e.g., to the pEntry persistent pointer in the segment Zero: it is the persistent pointer that points or will point to the global data entry point);
4. If the initialization procedure indicates that the memory was previously initialized (e.g., if initPM( ) returned false), get a reference to the global data structure (e.g., from pEntry), execute its recovery function, and resume the program
5. If the initialization procedure indicates that the memory was not previously initialized (e.g., if initPM( ) returned true), allocate the memory necessary to store the global data structure, instantiate it in the address obtained, get a reference to it and start the program normally.

In particular example implementations, these operations are performed in the illustrated order, though the operations can, in some cases, be re-arranged, performed with other procedures, and/or performed alone or in different sub-combinations with one another. In some cases, further steps may be taken to help the program resume in its correct state after a crash. In some cases, for example, the program can be made idempotent.

5. Example Computing Systems

Any of the disclosed methods (e.g., any of the disclosed memory management classes and functions) can be implemented as computer-executable instructions stored on one or more computer-readable media (e.g., tangible computer-readable memory or storage devices, such as one or more optical media discs, volatile memory components (such as DRAM or SRAM), or nonvolatile memory or storage components (such as hard drives, solid state drives (e.g., solid state drives based on flash memory), or SCM (such as NVRAM)) and executed on a computer (e.g., any suitable computer, including desktop computers, laptop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., tangible computer-readable memory or storage devices). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), a distributed computing network, or other such network) using one or more network computers. Additionally, any intermediate or final result created or modified using any of the disclosed methods can be stored on a storage medium (e.g., one or more optical media discs, volatile memory or storage components (such as DRAM or SRAM), or non-volatile memory or storage components (such as hard drives, solid state drives, or SCM (such as NVRAM)) and are considered to be within the scope of this disclosure.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in Python, C++, Java, Perl, JavaScript, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is designed or configured to perform any of the disclosed methods. For example, the disclosed methods can be implemented (entirely or at least in part) by an integrated circuit (e.g., an application specific integrated circuit (ASIC) or programmable logic device (PLD), such as a field programmable gate array (FPGA)).

Figure 3:
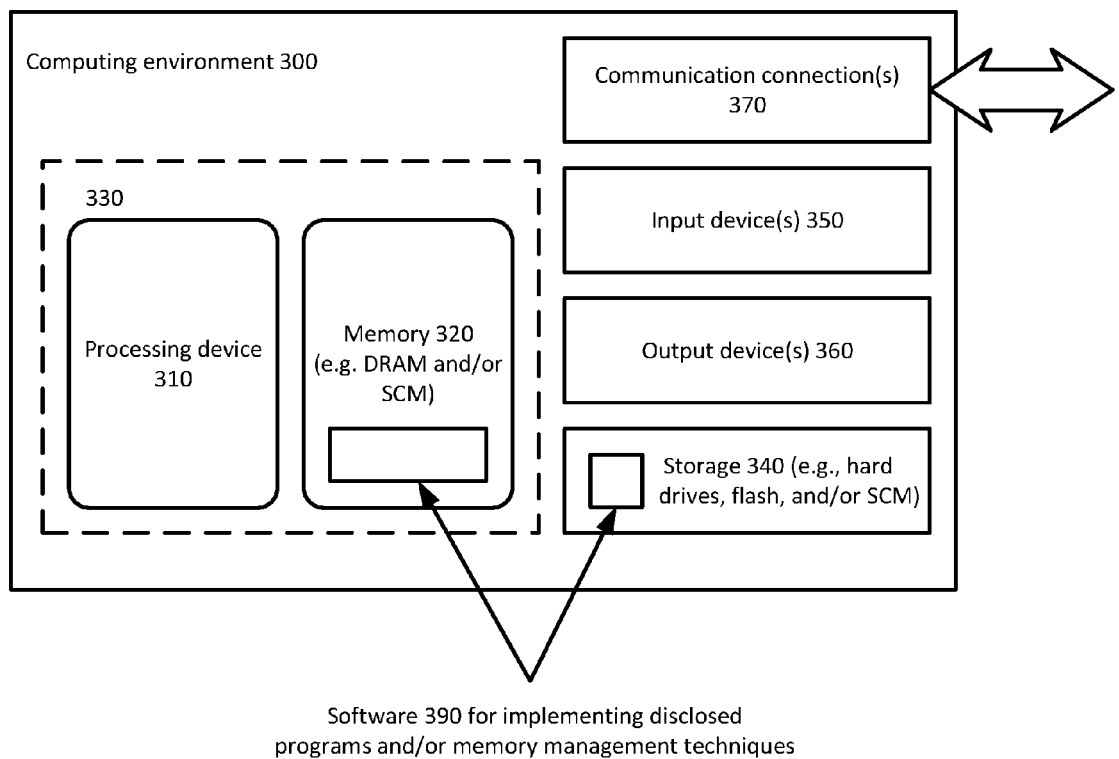
FIG. 3 is a schematic block diagram of an example computing environment in which aspects of the disclosed technology can be implemented.

FIG. 3 illustrates a generalized example of a suitable computing environment 300 of a computing system in which several of the described embodiments can be implemented. The computing environment 300 is not intended to suggest any limitation as to the scope of use or functionality of the disclosed technology, as the techniques and tools described herein can be implemented in diverse general-purpose or special-purpose environments that have computing hardware.

With reference to FIG. 3, the computing environment 300 includes at least one processing device 310 (e.g., CPU(s)) and memory 320. In FIG. 3, this most basic configuration 330 is included within a dashed line. The processing device 310 executes computer-executable instructions. In a multi-processing system, multiple processing devices execute computer-executable instructions to increase processing power. The memory 320 may be volatile memory (e.g., registers, cache, RAM, DRAM, SRAM), non-volatile memory (e.g., SCM (such as NVRAM), ROM, EEPROM, flash memory), or some combination of the two. The memory 320 can store software 390 implementing one or more of the described programs and memory management tools and/or techniques described herein. For example, the memory 320 can store software 390 for implementing any of the disclosed techniques described herein.

In particular embodiments, the memory 320 includes both DRAM and SCM (such as NVRAM). Any of the disclosed memory allocation and recovery techniques discussed herein can be used to manage the SCM in such memory 320.

The computing environment can have additional features. For example, the computing environment 300 can include storage 340, one or more input devices 350, one or more output devices 360, and one or more communication connections 370. An interconnection mechanism (not shown), such as a bus, controller, or network, interconnects the components of the computing environment 300. Typically, operating system software (not shown) provides an operating environment for other software executing in the computing environment 300, and coordinates activities of the components of the computing environment 300.

The storage 340 can be removable or non-removable, and includes one or more magnetic disks (e.g., hard drives), SCM (e.g., NVRAM), solid state drives (e.g., flash drives), magnetic tapes or cassettes, CD-ROMs, DVDs, or any other tangible non-volatile storage medium which can be used to store information and which can be accessed within the computing environment 300. The storage 340 can also store instructions for the software 390 implementing any of the described techniques, systems, or environments.

In particular embodiments, for example, storage class memory (SCM) is used for storage 340 (or to supplement one or more hard drives or non-volatile storage devices used in storage 340). For example, the computing environment may operate with the processing device(s) 310, volatile memory components for memory 320, and SCM configured to be used for storage purposes in storage 340. In some cases, the SCM (NVRAM) used for storage 340 supplements other storage devices (e.g., hard drives) and can be selectively used for particular programs or applications in which relatively fast restart times are desirable (e.g., database applications). Any of the disclosed memory allocation and recovery techniques discussed herein can be used to manage the SCM in such embodiments.

Still further, the SCM may actually be used in place of both storage 340 and volatile memory components typically used for memory 320. In such configurations, the processing device(s) 310 can directly access the SCM (NVRAM) in memory 320 and persistently write data to and read data from the SCM (NVRAM) without any need for further storage. In such configurations, a processing device cache may still be used as an intermediary between the processing device(s) 310 and the SCM (NVRAM) in memory 320.

In still further embodiments, the SCM is used in memory 320, but other storage devices are used for storage 340 (e.g., hard drives, solid state drives (e.g., flash drives), magnetic tapes or cassettes, CD-ROMs, DVDs, or any other tangible non-volatile storage medium). In such cases, the storage 340 is still used to persist data and may be updated from the SCM used in memory 320, but the SCM used in memory 320 enables the faster restart times associated with SCM and other benefits described herein in the event of a system crash. In such configurations, the processing device(s) 310 can directly access the SCM (NVRAM) in memory 320 and persistently write data to and read data from the SCM (NVRAM), but storage 340 is still used as the primary storage location for data. In such configurations, a processing device cache may still be used as an intermediary between the processing device(s) 310 and the SCM (NVRAM) in memory 320.

The input device(s) 350 can be a touch input device such as a keyboard, touchscreen, mouse, pen, trackball, a voice input device, a scanning device, or another device that provides input to the computing environment 300. The output device(s) 360 can be a display device (e.g., a computer monitor, laptop display, smartphone display, tablet display, netbook display, or touchscreen), printer, speaker, or another device that provides output from the computing environment 300.

The communication connection(s) 370 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 320 or storage 340 (both of which may include storage class memory) and do not include propagating carrier waves or signals per se (tangible computer-readable memory or storage devices do not include propagating carrier waves or signals per se).

The various methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

6. Concluding Remarks

Having illustrated and described the principles of the disclosed technology, it will be apparent to those skilled in the art that the disclosed embodiments can be modified in arrangement and detail without departing from such principles. For example, the disclosed techniques can be modified so that they are thread-safe. Further, the disclosed technology can be used in various diverse applications aside from a typical production database environment. For instance, for devices whose energy consumption matters more than the computing velocity, the NVRAM of the device could be switched off during periods of low activity, and then switched on almost instantly using the unique capabilities of the NVRAM itself combined with the allocation/recovery schemes disclosed herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. A method, comprising:
by a specialized memory allocator configured to assign portions of non-volatile RAM (NVRAM) for use by a program, the memory allocator being implemented by one or more processing devices:
writing first data to a memory allocator microlog, the first data including a first state ID indicating that the memory allocator is in a first state;
performing a first memory allocation operation, the first memory allocation operation corresponding to the first state;
writing second data to the memory allocator microlog, the second data replacing the first data and including a second state ID indicating that the memory allocator is in a second state; and
performing a second memory allocation operation, the second memory allocation operation corresponding to the second state.

2. The method of claim 1, wherein the memory allocator microlog is a data object that stores information for recovering the memory allocator without data inconsistencies and memory leakage in the event of a crash without storing an accumulating record of operations performed by the memory allocator.

3. The method of claim 1, wherein the memory allocator microlog is stored persistently in the non-volatile RAM.

4. The method of claim 1, wherein the memory allocator microlog is stored in a segment of the non-volatile RAM at a predefined offset.

5. The method of claim 1, wherein the first data further comprises copies of one or more variables that are modified during the first memory allocation operation.

6. The method of claim 1, wherein the first data further comprises one or more of: (1) a copy of the segment counterinvolved in the first memory allocation procedure; (2) a variable indicating whether the first memory allocation procedure is an allocate or deallocate procedure; (3) a number of bytes involved in the first memory allocation procedure; (4) a persistent pointer to a page involved in the first memory allocation procedure; (5) a persistent pointer to a segment involved in the first memory allocation procedure; or (6) a persistent pointer to a persistent memory location owned by the data structure that requested memory.

7. A system, comprising:
a non-volatile random access memory (NVRAM);
one or more processing devices; and
a memory allocator configured to operate with a program being executed by the one or more processing devices and to allocate one or more portions of the NVRAM for use by the program, the memory allocator being further configured to maintain and continuously update a recovery object persistently stored in the NVRAM, the recovery object storing data sufficient to recover a current state of the memory allocator in case of a system crash that interrupts operations performed by the memory allocator.

8. The system of claim 7, wherein the memory allocator is configured to allocate unique portions of the NVRAM for use by the program, the unique portions not being used by any other program of the system.

9. The system of claim 7, wherein the memory allocator, when first called by the program, performs a memory initialization process in which the memory allocator preallocates memory blocks of the NVRAM for use by the program, wherein the preallocated memory blocks have predefined sizes.

10. The system of claim 9, wherein the preallocation of memory blocks performed by the memory initialization process is performed without external knowledge of sizes of memory blocks actually used by the program.

11. The system of claim 7, wherein the recovery object stores data for use in a recovery procedure for the memory allocator without storing an accumulating record of operations performed by the memory allocator.

12. The system of claim 7, wherein the recovery object stores any one or more of: (1) a state ID identifying a current state of operation for the memory allocator; (2) a number of segments involved in a current memory allocation procedure; (3) a persistent pointer pointing to a pointer indicating whether the current memory allocation procedure is an allocate or deallocate procedure; (4) a number of bytes involved in the current memory allocation procedure; (5) a persistent pointer to a page involved in the current memory allocation procedure; (6) a persistent pointer to a segment involved in the current memory allocation procedure; or (7) a persistent pointer to a persistent memory location owned by the data structure that requested memory.

13. The system of claim 7, wherein the system further comprises:
a memory cache in communication with the one or more processing devices and the NVRAM, the memory cache being configured to temporarily store data before the data is persistently stored in the NVRAM in accordance with instructions provided by the one or more processing devices, the memory cache consisting of volatile memory.

14. A method, comprising:
by one or more processing devices, testing code of a program that uses non-volatile random access memory (NVRAM) for data storage by simulating execution of the code of the program that uses NVRAM for data storage using a simulator that does not use NVRAM wherein the simulating of the program comprises,
executing the code of the program in a parent process; and
when execution of the code of the program calls for creation of one or more segments of NVRAM, creating original one or more segments of memory in volatile random access memory (RAM) and also creating corresponding one or more copies of the segments of the memory in the volatile RAM.

15. The method of claim 14, wherein the simulating of the program further comprises, when a cache memory line at an address is flushed in accordance with the code of the program, copying data at the address to the copy of the segment.

16. The method of claim 15, wherein the simulating of the program further comprises, during execution of the code of the program, randomly calling a crash function.

17. The method of claim 16, wherein the simulating of the program further comprises, upon calling the crash function:
pausing execution of the code of the program by the parent process;
creating a second copy of the copy of the segment; and
creating a child process that executes a copy of the code of the program using the second copy of the segment and attempts to recover normal execution of the program.

18. The method of claim 17, wherein the child process executes the copy of the code of the program independent of the paused execution of the code of the program by the parent process.

19. The method of claim 17, wherein the child process operates using the second copy without modifying the original segment, thereby testing whether the child process can recover from the crash function without disturbing the original segment.

20. The method of claim 17, wherein the method further comprises resuming operation of the parent process upon the child process recovering from the crash function.

* * * * *